Nov. 11, 1958  E. C. POLIDOR  2,859,523
ENGRAVING MACHINE
Filed Dec. 18, 1953  6 Sheets-Sheet 1

INVENTOR.
Edward C. Polidor,
BY
Parker, Prochnow Farmer,
Attorneys.

Fig. 2.

Nov. 11, 1958    E. C. POLIDOR    2,859,523
ENGRAVING MACHINE
Filed Dec. 18, 1953    6 Sheets-Sheet 4

INVENTOR.
Edward C. Polidor,
BY
Parker, Brochman Farmer,
Attorneys.

Nov. 11, 1958 E. C. POLIDOR 2,859,523
ENGRAVING MACHINE
Filed Dec. 18, 1953 6 Sheets—Sheet 5

INVENTOR.
Edward C. Polidor,
BY
Parker, Prehnow & Farmer,
Attorneys.

Nov. 11, 1958  E. C. POLIDOR  2,859,523
ENGRAVING MACHINE
Filed Dec. 18, 1953  6 Sheets-Sheet 6

INVENTOR.
Edward C. Polidor,
BY Parker, Prochnow & Horner
Attorneys.

United States Patent Office 2,859,523
Patented Nov. 11, 1958

2,859,523
ENGRAVING MACHINE
Edward C. Polidor, Rochester, N. Y., assignor to Optical Gaging Products, Inc.

Application December 18, 1953, Serial No. 399,041

13 Claims. (Cl. 33—26)

This invention relates to engraving machines for scribing lines on a face of an object. An object of the invention is to provide an improved machine of this type with which one may accurately and quickly scribe arcuate, circular or straight lines with any desired spacing between them, and scribe straight lines with any desired angle between them.

Another object is to provide a scribing machine with which the relative spacing movement between the lines can be quickly performed, with which the adjustments for locating the lines on the object will be convenient, simple and easily performed, and which will be exceptionally simple, compact, practical, accurate and inexpensive.

Other objects and advantages will be apparent from the following description of an embodiment of the invention, and the novel features will be particularly pointed out hereinafter in connection with the appended claims.

Figure 1:
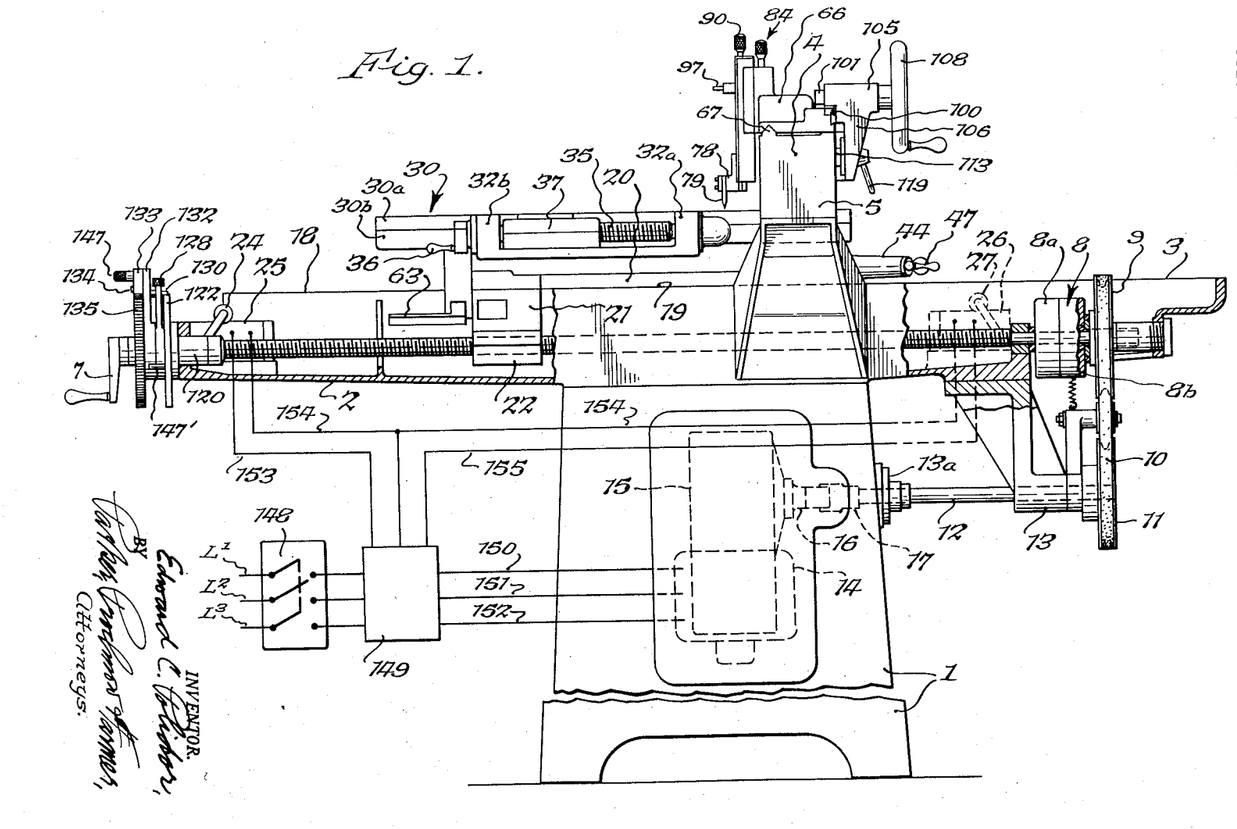
Fig. 1 is a front elevation of a machine embodying the invention, with certain parts broken away to show certain details of construction.

In the illustrated embodiment of the invention, and referring first to Fig. 1, the machine includes a base 1 having sidewise extensions 2 and 3 at opposite ends thereof, and also having a bridge 4 extend across the top of the machine from front to rear. This bridge also has front and rear extensions 5, see Fig. 2. A screw 6 is disposed above the extensions 2 and 3, and is rotatably supported at its ends in the extensions 2 and 3, and also held against endwise movement in the bearings which support it. A crank 7 is fixed on the one end of the screw 6 by which the screw 6 may be manually rotated, and an electrical clutch 8 is provided on the other end portion of the screw 6. This clutch 8 includes a section 8a which is fixed on the screw 6, and another section 8b which is rotatably mounted on the screw in face to face relation to the section 8a. The section 8b includes a driven pulley 9 which is driven by a belt 10 that also runs over a driving pulley 11.

The pulley 11 is fixed on a shaft 12 which is rotatably supported in a bearing 13 that depends from the extension 3. The shaft 12 is also mounted rotatably in a bearing 13a which is provided in a side wall of the base 1. A reversible motor 14, provided in the base, drives a gear reducer 15 of any suitable make, by which its speed is reduced to a desired extent, and the delivery shaft 16 of this gear reducer is coupled by a universal coupling 17 to an end of the shaft 12 with which it is appropriately alined. The motor thus runs a gear reducer and through it rotates the shaft 12 at a speed very much reduced from that of the motor shaft, and the shaft 12, in turn, drives the screw 6 when the clutch 8 is coupled. The motors, gear reducers, universal couplings and electrical clutches are well known in the art and they have been shown only generally, because they are used as complete elements in the combination.

Figure 2:
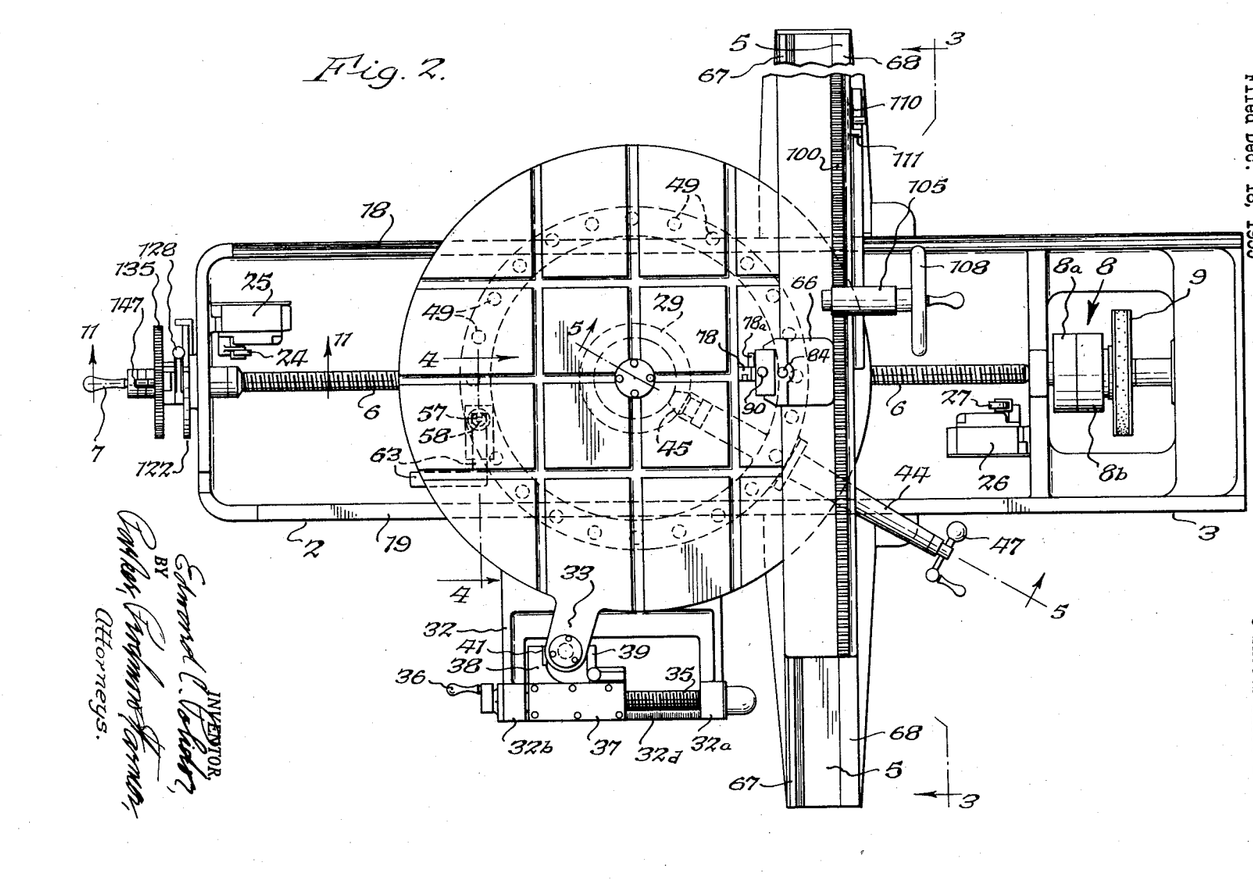
Fig. 2 is a plan of the same.

The base 1 and its extensions 2 and 3 have trackway guides 18 and 19 similar to those employed on a lathe, which extend from left to right in Figs. 1 and 2. A carriage 20 is slidingly mounted on these guides 18 and 19 in the same manner that a lathe carriage is mounted to move along the ways or guides of a lathe bed. This carriage 20 has a depending lug or arm 21 which terminates in a split nut 22 at its lower end, through which the screw 6 extends so that when the screw 6 is rotated, it will move the nut 22 lengthwise along the screw and through it can move the carriage 20 back and forth in a direction from side to side and beneath the bridge 4. The carriage has the projecting lug 21, Fig. 1, at one end which is disposed to engage and operate a roller 24 of a limit switch 25 when the carriage reaches and attempts to pass a desired limit of movement in one direction. A similar limit switch 26 is disposed at the other end of the bed, which would be on the extension 3, and a roller 27 on its operating arm is disposed in the path of the same projecting lug 21 so as to operate the switch 26 when the carriage reaches and attempts to pass the limit of travel in that direction.

Figures 3, 4, 5:
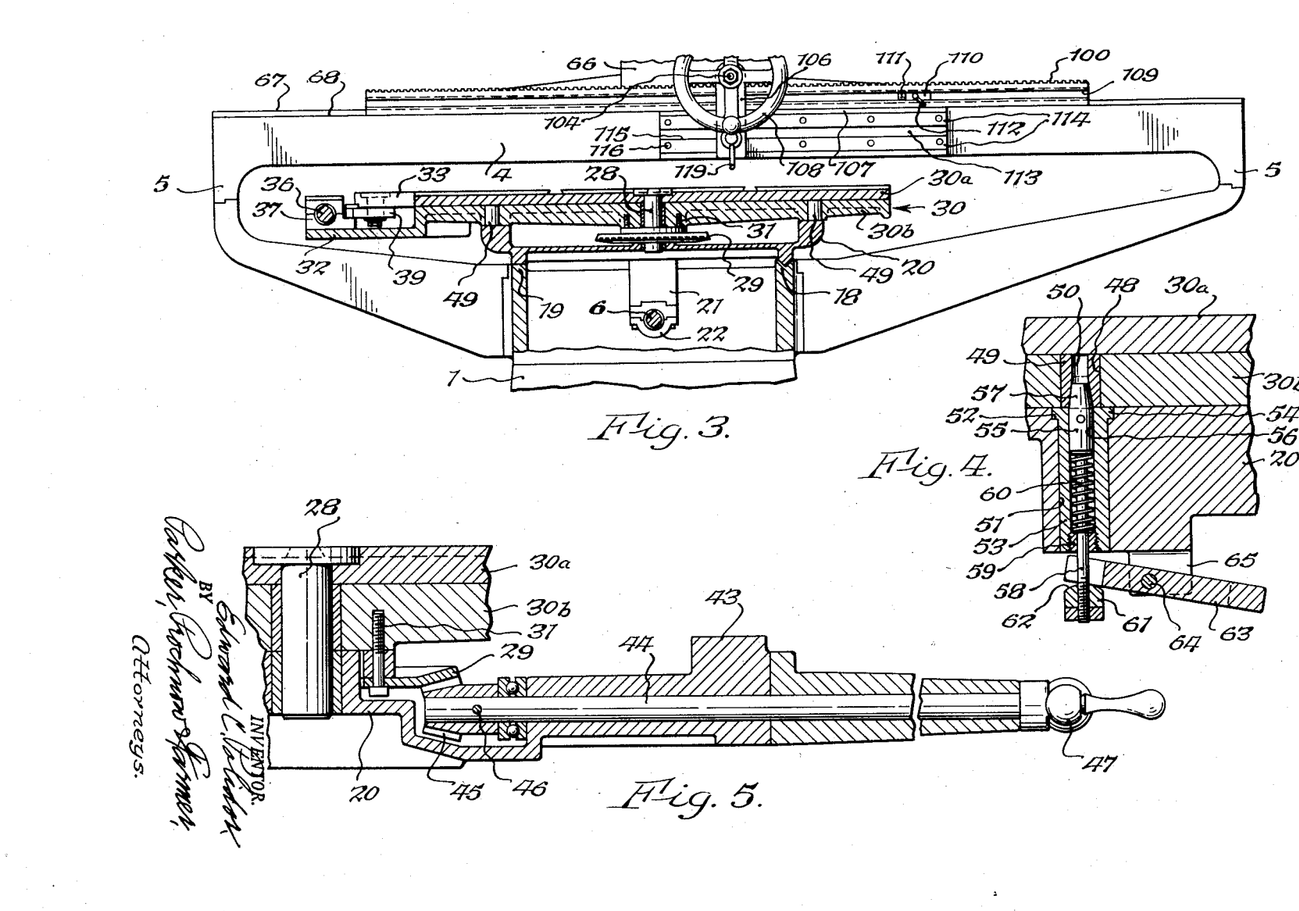
Fig. 3 is a sectional elevation of a portion of the same, the section being taken approximately along the line 3—3 of Fig. 2.
Fig. 4 is a sectional elevation of a portion of the same, the section being taken approximately along the line 4—4, Fig. 2.
Fig. 5 is a sectional elevation of another portion of the same, the section being taken approximately along the line 5—5, Fig. 2.

The carriage 20, Fig. 3, rotatably supports a short, upright shaft 28, and a bevel gear 29 is fixed on the lower part of this shaft 28. Rotatably mounted on the shaft 28 above the gear 29 is a table 30 which is formed of two superposed sections 30a and 30b. The lower section 30b rests upon the hub of the bevel gear 29, and screws 31 which extend from the end face of the hub of gear 29 enter alined recesses in the lower face of the table section 30b and thus provide a rotary driving connection between the bevel gear 29 and the table section 30b. The lower section 30b of the table has a radially extending arm 32 that extends beyond the periphery of the upper section 30a, see Figs. 2 and 3. The upper section 30a carries an arm 33 which extends over the arm 32 and at its end carries a roller 34 which is mounted for rotation about a vertical axis. The arm 32 has spaced, upstanding bearing lugs 32a and 32b at its free end, and a screw 35 extends between the lugs 32a and 32b and is rotatably supported thereby. A crank handle 36 on one end of screw 35 enables one to rotate this screw. A nut 37 is provided on the screw 35, and this nut is held against rotation on the screw 35 by engagement of a flat side of the nut with the upper face of the arm 32, so that while the nut 37 may move endwise along the screw when the screw is rotated, it cannot rotate with the screw. A horizontally extending arm 38 is fixed on the nut and extends toward the shaft 28, and a bell crank lever 39 is also pivoted at 40 on nut 37.

One arm of the bell crank lever 39 extends parallel to the arm 38, but in spaced relation thereto, and the roller 34 of the upper table section 21 is received between the arm 38 and that arm of the bell crank lever 39 which is parallel to arm 38, as shown in Fig. 2. The arm 38 has a hardened wear plate 41 on the side face which engages the roller 34 so as to reduce wear, and the bell crank lever 39 is yieldingly urged into contact with the roller 34, see Fig. 6, by a helical spring 42. The roller 34 is thus yieldingly held against the wear plate 41 and this accurately positions the roller 34 and through it the upper table relatively to the lower table, and there is no play in the connection between the two table sections.

A dial on the crank 36 has a zero mark 36' which registers with a dial 32c mounted on the arm 32 which may read in minutes, degrees or thousandths of an inch. Another reading may be made for larger movements by use of a scale 32d on the arm 32, by using the right-hand edge of the nut 37 which passes along this scale.

The carriage 20 is provided with a radially disposed arm 43, Fig. 5, which rotatably supports an operating shaft 44. The inner end of the shaft 44 carries a pinion 45 which is pinned to the shaft by a pin 46 that passes through the hub of the pinion and the shaft. The outer end of the shaft 44 carries an operating crank arm 47 by which the shaft 44 may be rotated in order to rotate the pinion, and through it rotate the lower section of the turntable. The lower face of the table is provided with a plurality of recesses 48 arranged in a circular row disposed concentrically with the axis of rotation of the table. Each of these recesses 48, Fig. 4, is provided with a bushing 49 which fits tightly therein, and each bushing has a passage 50, the lower part of which is downwardly divergent or tapered.

The carriage 20, in the portion immediately below the path of movement of the row of bushings 49 is provided with an upwardly extending passage 51 with an upwardly facing shoulder 52 slightly below its upper end. A bushing 53 is disposed in the passage 52 to fit it and is provided with a head 54 which engages against the shoulder 52 to limit downward movement of the bushing 53. The upper face of the head 54 is flush with the upper face of the part of the carriage over which the row of apertures travels, and the lower table section 30b rides upon this upper face of the carriage 20. A small pin 55 is slidingly disposed in the upper part of the passage 56 of the bushing 53 and its upper end 57 is tapered to fit the taper in the lower end of any passage 50 which is alined with it at any time.

The pin 55 is carried on a rod 58 which extends downwardly below the lower end of the bushing 53, and passes through a nut 59 that is screwed into the lower end of passage 56 so as to be slidingly mounted and guided by the nut 59. A helical spring 60 is compressed between the nut 59 and the pin 55 so as to yieldingly urge the tapered pin end 57 upwardly at all times. A nut 61 is screwed to the lower end of the rod 58, and its upper end 62 is convexly arcuate. A lever 63 is pivoted at 64 to a lug 65 depending from the carriage 20.

One end of the lever 63 is bifurcated, the arms of which straddle the rod 58 and bear against the arcuate end face 62 of nut 61 so that when one lifts the other end of lever 63, it will pull the rod 58 downwardly and through it pull the pin end 57 out of the passage 50 in the bushing in which it has been disposed. When the pin 57 is in a passage 50, it definitely locates the lower table section, and the holes 48 in the circular row are equally spaced in a definite manner. Thus, one may locate the lower table section accurately in any of a large number of angular positions, and hold the table section releasably in any of those selected positions.

By turning the screw 35 through manipulation of the crank handle 36, Fig. 2, one may adjust the upper table section relatively to the lower table section with a very accurate, slow motion type of adjustment. One locates the table first by one of the row of holes 48, and then turns the handle 36 and screw 35 to adjust the upper table section on the lower section to a desired intermediate position between the positions located by the holes 48.

Figures 6, 7, 8:
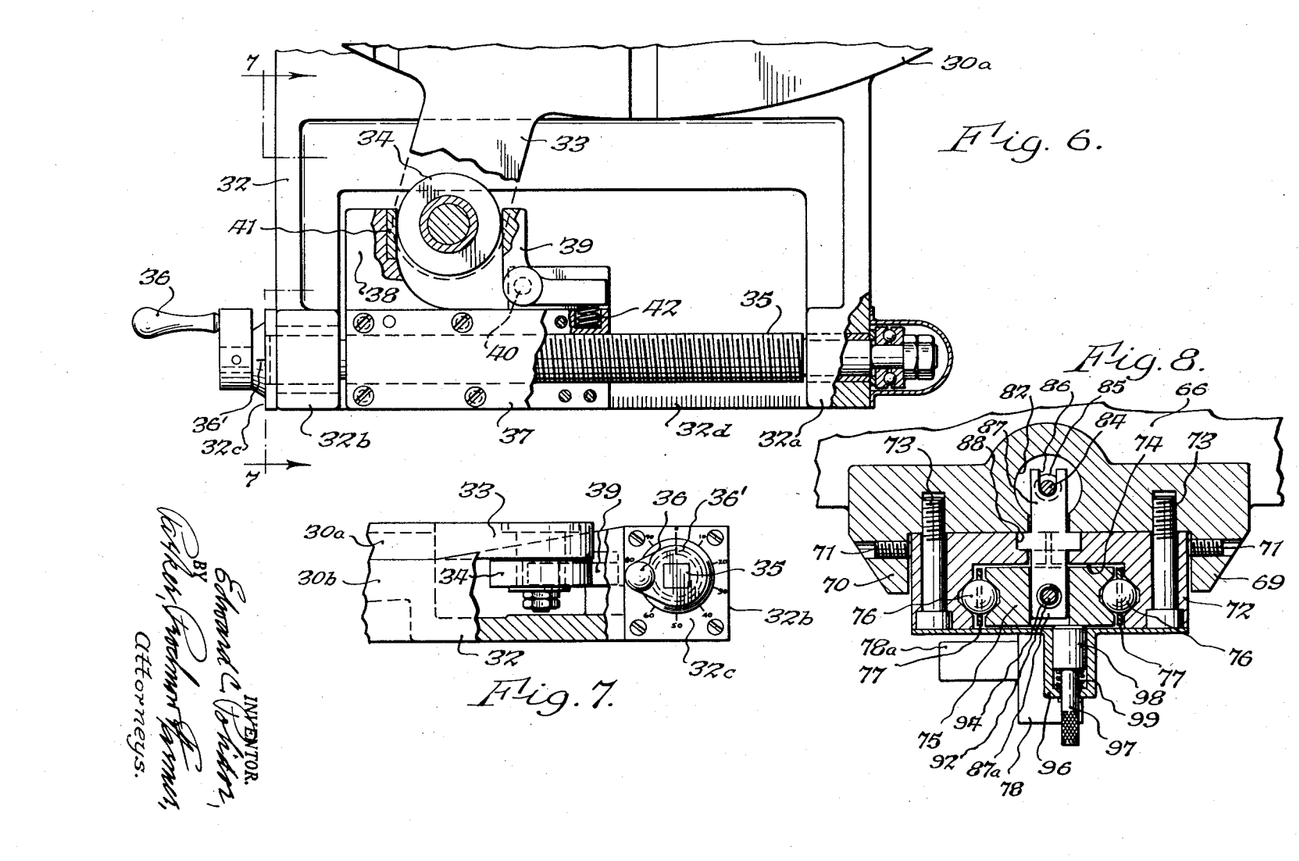
Fig. 6 is a plan on a larger scale of certain details of Fig. 2 with portions broken away to show details of construction.
Fig. 7 is an end elevation of the parts shown in Fig. 6, as viewed from the line 7—7 of Fig. 6.
Fig. 8 is a transverse, sectional plan of the cutter slide and certain parts carried thereby, the section being taken approximately along the line 8—8, Fig. 10.
Figure 9:
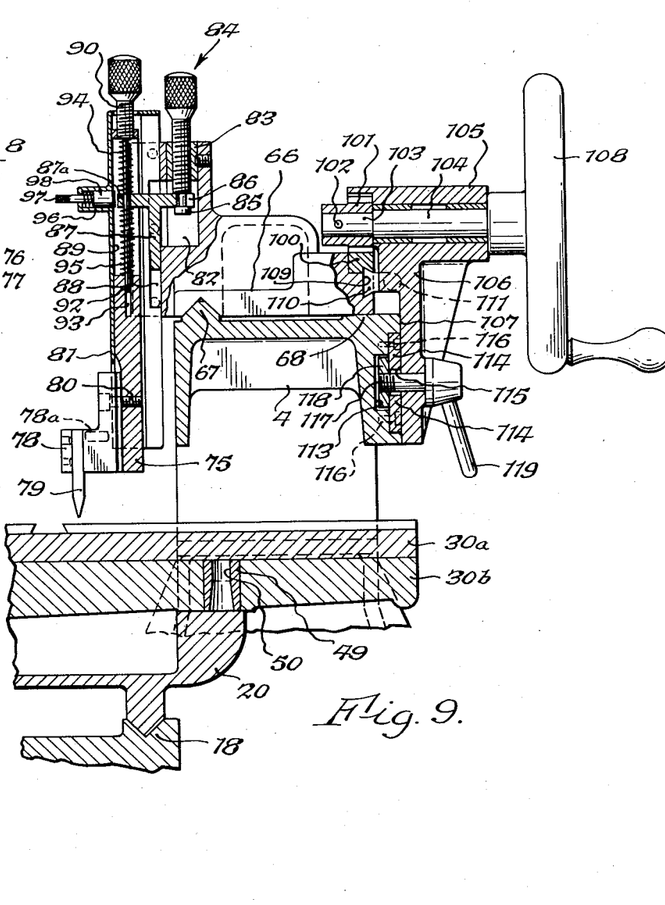
Fig. 9 is a sectional elevation, in a direction from front to rear, through the bridge and the table at the cutter side, the latter having parts broken away.
Figure 10:
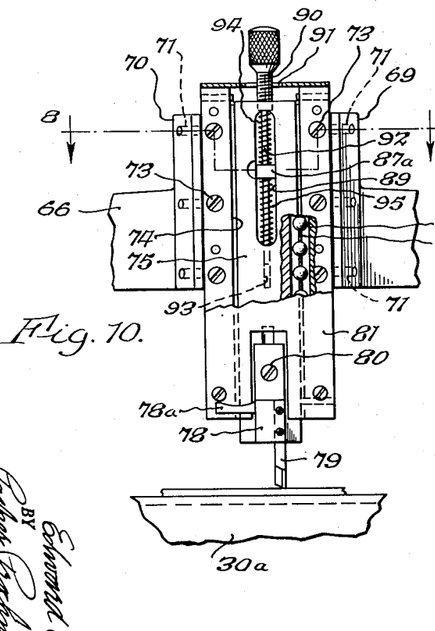
Fig. 10 is a front elevation of the scriber mounting.

Referring now to Figs. 8, 9 and 10, an auxiliary carriage 66, Fig. 9, is mounted to slide upon guides or ways 67 and 68 which resemble the guides or ways on the base of a lathe bed on the bridge 4. In this example the guide 67 is an accurately machined, V-shaped rib running lengthwise of the bridge 4 along one edge thereof, and the guide 68 is an accurately machined, flat surface on the upper face of the bridge, near its opposite side edge. The carriage 66 has a pair of vertically extending, spaced apart, parallel arms 69 and 70, Fig. 8, and confined between the arms 69 and 70, located by set screws 71, is a frame 72. Machine screws 73 confine this frame 72 to the carriage 66. This frame 72 has a vertical channel 74 in its outer front face in which is disposed a cutter slide 75.

A straight row of ball bearings 76 is disposed along each side edge of the slide 75 to provide a rolling support between the frame 72 and slide 75. A ball cage 77 is provided for each row of ball bearings so as to hold them properly spaced. The cutter slide 75 is thus mounted for free and easy travel vertically on the auxiliary carriage 66. Mounted on the lower end of the slide 75 is a tool holder 78 (Fig. 9), which detachably mounts a scribing tool 79 that depends from the holder 78. The holder 78 is secured to the slide 75 by a screw 80. A face plate 81 covers the front face of the frame 72 and the cutter slide 75. A finger 78a on holder 78 enables one to push the holder and tool downwardly when desired, as will be later explained.

The carriage 66 is provided at its top with a recess 82 which is normally closed by an annular plug 83. A screw 84 has its shank threaded through the plug 83 and at its lower end it has a reduced, non-threaded end 85 with an annular groove in the lower end of the screw which is received in the slot 86 in an arm of a slide member 87.

The slide member 87 is slidingly confined in a channel 88, Figs. 8 and 9, provided on the inner face of the frame 72 which abuts a face of the carriage 66. This slide member 87 has another arm 87a which extends in the opposite direction from the arm with slot 86, into the channel 74 and also a slot 89 from face to face, in the upper part of the cutter slide 75. A screw 90 is threaded through the upper end of the slide 75 in a vertical direction, and passes loosely through an aperture 91 in a rearwardly extending flange of the face plate. This screw 90 has a reduced shank 92 within the slot 89 and this reduced shank extends slidingly through an aperture in the arm 87a of the slide 87. The lower end of the screw shank 92 is slidingly received in a passage 93 in the bottom of slot 89 of the slide 75. A helical spring 94 is confined under compression on the reduced shank 92 between the shoulder at the junction of the shank 92 with the threaded part of the screw, and the upper face of the arm 87a. Another helical spring 95 is confined under compression on the shank 92 of the screw 90 between the lower face of the arm 87a and the lower end wall of the slot 89. The slide 87 is thus resiliently held against movement vertically in both directions. By rotating the screw 84, one may increase or decrease the pressure of the spring 95 downwardly on the slide 75, and thus control the pressure of the scribing tool 79 on the work, and even hold the tool slightly elevated. If so elevated, the tool may be manually pushed down to engage the work on the table by downward pressure on finger 78a.

The face plate 81 is provided with a forwardly extended boss 96, Figs. 8 and 9. This boss is open at its inner end and closed at its outer end, but the closed, outer end is provided with an aperture in which a plunger 97 can reciprocate. The inner end of the plunger 97 carries an enlarged head 98 which bears against the outer face of the cutter slide 75. A coil spring 99 is confined between the head 98 and the closed end of the boss 96, and is under compression to urge the head 98 against the cutter slide 75, and thus prevent chatter of the cutter bar or slide 75.

The side of the carriage 66 which is opposite from the cutter bar is provided with a longitudinally extended rack bar 100, Fig. 9, and this rack bar meshes with a pinion 101 which is secured by a pin 102 to the reduced end 103 of the shaft 104. The shaft 104 is rotatably mounted in a bearing 105 provided on the upper end of a bracket 106 which fits against a vertical face 107 of the bridge 4. A hand wheel 108 is fixed on that end of the shaft 104 opposite from the pin 101, so that by turning the hand wheel 108, the rack bar 100 may be reciprocated endwise, and because it is fixed on the carriage 66, this will cause travel of the carriage 66 back and forth along the bridge 4. The face of the carriage 66, which is opposite from the cutter bar 75, is provided with a horizontally extending channel 109, see Figs. 3 and 9, and in this channel 109 is disposed an adjustable stop 110 which projects outwardly from the channel. This stop 110 has a stop lug 111 in the path of movement of the bracket 106 when the latter moves along the face 107, and this stop 110 may be adjustably secured in any of its positions along the channel 109 by tightening the handle 112, see Fig. 3.

The bracket 106, Fig. 9, is adjustably confined to the face 107, and for this purpose the face 107 is provided with a horizontal recess or cavity 113. Bars 114, Figs 3 and 9, extend lengthwise of the cavity 113 along its upper and lower edges, and are countersunk in the cavity flush with the outer face 107 of the bridge, which provides a slot 115 between the bars opening into the cavity. The bars 114 may be detachably secured to the face 107 by a number of screws 116 which pass through the bars and are threaded into the bridge with the heads of the screws countersunk into the bars. A shaft 117 is rotatably mounted in the bracket 106 and extends from both faces thereof. The inner end of the shaft 107 is threaded and receives a nut 118 which is disposed within the bottom part of the cavity 113 and fits against the rear or inner faces of the bars 114. The outer end of the shaft 117 carries an operating handle 119 by which the shaft may be turned. When the handle 119 is turned, it either tightens or loosens the nut 118 against the bars 114, and thus serves to clamp the bracket to the face 107 of the bridge 4 and hold the bracket firmly thereagainst. Thus, by turning the handle 119, one may release the bracket, shift the bracket along the bridge to a limited extent, and then tighten it to clamp the bracket in that adjusted position.

Referring next to Figs. 11 to 16, the mechanism for accurately imparting increments of rotation to the screw 6 will be described. The end of screw 6 adjacent to handle 7 is rotatably supported in a bearing bushing 120, Fig. 11. This bushing is carried by the extension 2 of the base 1, and has an angular, peripheral flange 121 intermediate of its ends, and disposed on the exterior of the bushing and abutting against the outer face of the flange 121 is a dial, disc or plate 122 which is secured against rotation on the bushing by a screw 123 which passes through the dial and the flange 121 and is threaded into the upstanding boss 124 of the extension 2. This dial 122 is provided on its peripheral edge with scale graduations 125, see Figs. 13 and 15.

Rotatably mounted on the bushing 120 in front of the dial 122 is an arm 126. The bearing of this arm on the bushing 120 is split at 127, and a screw 128 is rotatably mounted in a lateral lug 129 on the arm 126. This screw extends along one side of the bushing 120, passes through the sections of the boss of arm 126 at the split and is rotatably mounted in the first section of the boss at the split, and is threaded into the second section beyond the split, so that by tightening the screw, one may tighten the boss of arm 126 on the bushing 120. This enables one to clamp the arm 126 releasably in any of a plurality of different angular positions into which it may be rocked on the bushing 120. The head of the screw 128 bears against the lug 129 so that it can pull the sections of the boss together at the split and thus clamp the boss of arm 126 firmly to the bearing bushing 120.

Figures 11, 12, 13, 16, 17:
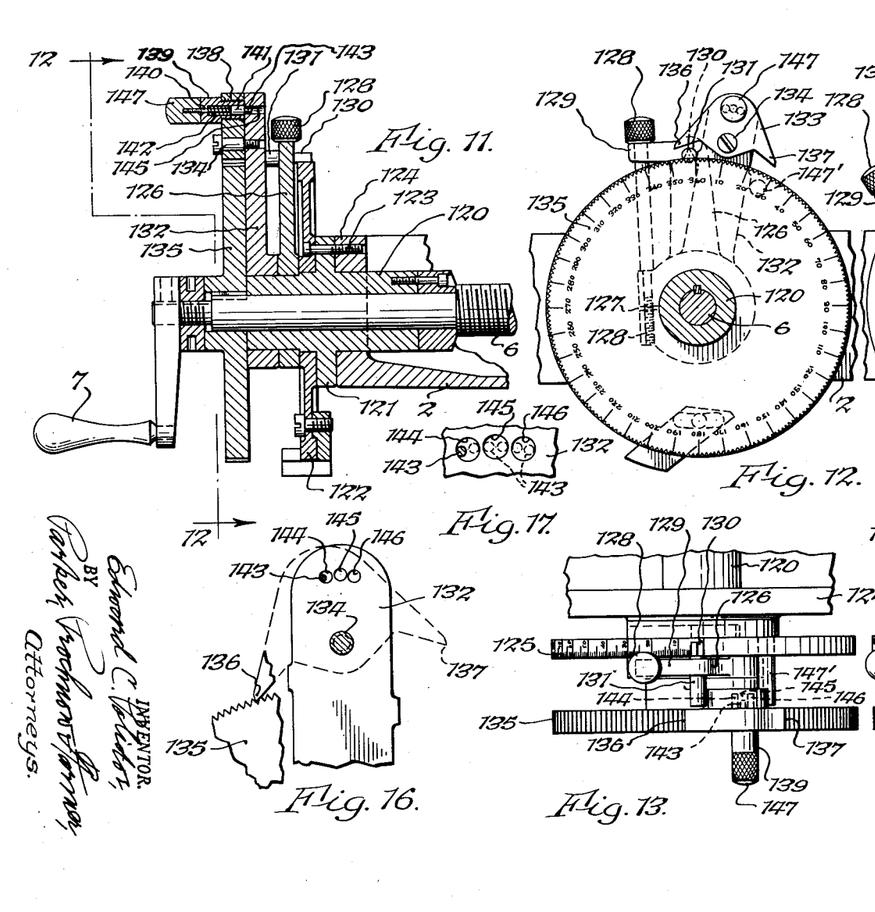
Fig. 11 is a sectional elevation through the indexing mechanism.
Fig. 12 is another sectional elevation of the same, the section being taken approximately along the line 12—12 of Fig. 11.
Fig. 13 is a plan of the same with the mechanism ready for operation.
Fig. 16 is a fragmentary, sectional elevation of certain details of the indexing mechanism.
Fig. 17 is another fragmentary, sectional elevation of certain parts of the indexing mechanism.

The arm 126 has a pin 130 extending from one face thereof, and another pin 131 alined with pin 130 and extending from the opposite face thereof, as shown in Fig. 13. The pin 130 runs over the dial graduations 125 on the dial 122 and is preferably triangular in a transverse cross section with one face of the triangle lying along the periphery of the dial 122. The corners of the pin 130, which are at the edges of the face of the pin which lies along the periphery of the dial 122, serve as reference edges by which the position of the pin along the graduations 125 may be determined and compared.

Rotatably mounted on the bushing 120 in front of the arm 126 is another arm 132, Figs. 12 and 13, and this arm 132 extends radially from the bushing, outwardly beyond the periphery of the relatively fixed dial 122. A dual pointed detent 133 is rockably mounted by screw 134 on the free end of arm 132 in a position above the periphery of a ratchet wheel 135 having its ratchet teeth on its periphery. This wheel 135 is keyed to the screw 6 and abuts against the outer end face of the bearing bushing 120 that rotatably supports the outer end of the screw shaft 6. The detent 133 has oppositely extending pawls 136 and 137, see Figs. 12 and 14 which may engage alternately with the ratchet teeth on the periphery of the wheel 135. The detent 133 is provided with an aperture 138, Fig. 11, from face to face, and a bushing 139, see Fig. 11, is threaded into this aperture 138. A plunger 140 passes through and slides in the closed end of the bushing 139, and within the bushing carries a head 141 that is slidingly guided in the passage of this bushing. A spring 142 is compressed between the closed end of the bushing and the head 141 so as to urge the head 141 toward the arm 132. The head 141 is provided with a pin 143 which may enter any one of three different apertures 144, 145 and 146, see Fig. 17, in the outer end of the arm 132. A button 147 is fixed on the outer end of the plunger 140, so that one may pull the plunger outwardly and thus pull the head 141 into the bushing to a farther extent and withdraw the pin 143 from any one of the three recesses 144, 145 and 146, which releases the detent 133 to rock. These three recesses are arranged in an arcuate row which has its center of curvature at the axis of the pivot screw 134. The pin 143, see Fig. 17, has a diameter less than one-half the diameter of each of the apertures 144, 145 and 146, so that while the pin 143 is in any one of the apertures, it can move from side to side in those apertures to a limited extent, sufficient to allow the detent edges 136 or 137 to ride over the ratchet teeth on wheel 137. Thus the detent 133, by placing the pin 143 in any one of the apertures 144, 145 and 146, may be located in any of three different angular positions determined by the position of pin 143 and yet have limited rocking movement while in any of those three adjusted positions.

Figures 14, 15:
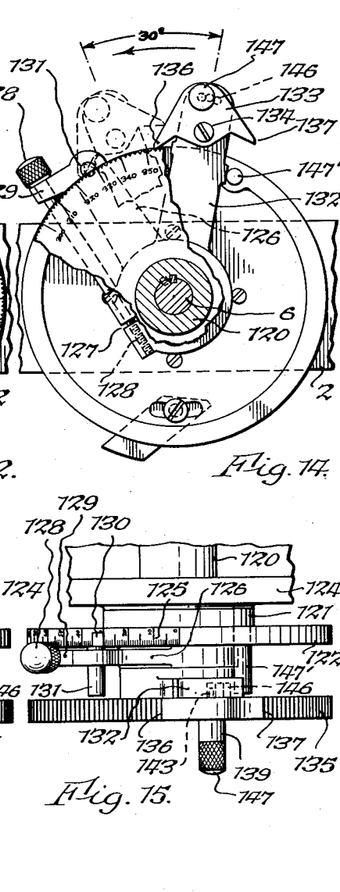
Fig. 14 is a sectional elevation similar to Fig. 12 but with some of the parts broken away.
Fig. 15 is a plan of the same similar to Fig. 13, but with the parts of the mechanism shown in the relative positions occupied after an advance given to the screw.

When the pin 143 is in the aperture 144, as shown in Figs. 14, 16, and 17, the detent 133 will be in the position shown in Fig. 14 in which its pawl or edge 136 engages with the ratchet teeth on the ratchet wheel 135. Any movement of the arm 132 to the left in Fig. 14 will thus move the ratchet wheel 136 until the pawl 136 engages with the stop pin 131 on the arm 126. The arm 132 normally engages against a stop pin 147' provided on a face of the relatively fixed dial 126, which determines its starting position. At the end of its forward movement, the arm 132 is returned to the initial position against the stop pin 147' and during this return movement, the pawl 136 rides idly over the ratchet teeth of wheel 135 which is permitted by the clearance between the pin 143 and the wall of the aperture 144. By loosening the screw 128 and adjusting the arm 126 angularly about the screw 6, one may determine the extent of permissible movement of the arm 132 at each operation. This determines the amount of the increment of rotation to be imparted to screw 6, and which in turn imparts a proportionate increment of translation to the table carriage 20.

When the pin 143 is placed in the middle aperture 145, it holds both pawls or points 136 and 137 out of engagement with the teeth of the ratchet wheel 135, and then any angular movement of the arm 132 will not cause any movement of the screw 6. When the pin 143 is placed in the aperture 146, then the pawl or point 137 will be in engagement with the ratchet teeth on the periphery of the ratchet wheel 135, and then all return rocking movements of the arm 132 between the stop pin 147', and the stop 131 will cause increments of rotation of the ratchet wheel in the opposite direction or clockwise in Fig. 12, the amount of the increment depending upon the setting of the arm 126. The face of the wheel 135 is provided with graduations in degrees or may be provided with markings of thousandths of an inch, so that the amount of each increment of movement may be determined. Thus by rocking the arm 132 back and forth to the extent permitted by the setting of arm 126, one may impart any number of successive increments of rotation of the screw 6, which imparts corresponding proportional movements of translation to the table beneath the scribing tool. This ratchet mechanism is therefore something like a micrometer operation of the screw 6.

The control of the motor 14, in order to cause rapid movements of the screw 6, may be obtained in any suitable manner, and a simple circuit for that purpose is illustrated in Fig. 1. The circuit line wires L', L² and L³ are brought through a control or disconnect switch 148, and pass through a reversing starter 149. From this starter, wires 150, 151 and 152 lead to the motor 14 for operating it selectively in one direction or the other, and a branch wire 153 leads from the reversing starter 149 to the limit switch 25. A common circuit wire 154 leads from the limit switch 25 to the reversing starter 149 and to the other limit switch 26. One wire 155 leads from the reversing starter 149 to the limit switch 26. Inasmuch as these limit and disconnect switches and reversing starters are available in the open market, they have not been described in detail herein, because the details of the switches and starters are not in themselves a part of this invention.

It will be observed that with this arrangement, the table may be given rapid movements of translation back and forth by means of the motor 14, or the table may be given very small accurately determined increments of movement through the operation of the screw 6 by the handle 7 or by the ratchet mechanism illustrated in Figs. 11 to 16. By operation of the handle 47, see Fig. 2, one may give rotary movements to the complete table, when the table is released for rotation by the operation of the arm 63. The engagement of the rocking pin 57 with any of the bushings 49 gives a primary location of the table in a rotary movement, and the operation of the handle 36, see Fig. 2, to turn the screw 35 serves to position the upper section of the table by a small movement resembling that of a micrometer, so as to obtain graduations of positions between those that are determined by the engagement of the bushing pin 57 with one of the bushings 49.

It will be understood that various changes in the details and arrangements of parts, which have been herein described and illustrated in order to explain the nature of the invention, may be made by those skilled in the art within the principle and scope of the invention as expressed in the appended claims.

I claim:

1. In an engraving machine of the type having a base, a carriage mounted on said base for rectilinear movement in opposite directions, a table rotatably mounted on said carriage for travel therewith and also rotatable on the carriage, a bridge carried by said base and extending across and above the path of travel of the carriage and table, a cutter slide mounted on said bridge for rectilinear travel in directions crosswise of those of said carriage, and a scriber mounting carried by said slide and movable vertically thereon toward and from the table, said table having two superposed sections, the top section being rotatable upon the lower section about the axis of rotation of the table, said lower section having regularly spaced downwardly opening recesses arranged in a circular row about said axis of rotation of the table, a locating pin mounted on said carriage below and along said circular row in a position to enter and fit said recesses in succession as said lower table section is rotated, a spring urging said locating pin into any recess aligned therewith to position and hold said lower table section accurately in any of several different angular positions, means to retract said locating pin when rotation of said lower table section is desired, means carried by said carriage for rotating said lower table section in any of the latter's position in its travel with said carriage, and slow motion means connected between the table sections by which limited fine and accurate angular adjustment of the upper table section on the lower section may be obtained, whereby when a work object is mounted on the upper table section and a scriber tool is mounted in said scriber mounting, accurately spaced lines, both circular and straight and at any angle, may be scribed on said work object through relative movements of the slide, table and carriage.

2. The engraving machine substantially as set forth in claim 1, said slow motion means including a roller carried by said upper table section, a screw rotatably mounted on the lower table section, a nut on said screw and having spaced, parallel jaws between which said roller is received, one of said jaws having a hardened wall face which engages the roller, the other of said jaws being movable toward and from said one jaw, and means resiliently urging said other jaw against said roller to press said roller continuously against said hardened wall face.

3. In an engraving machine of the type having a base, a carriage mounted on said base for rectilinear translation in opposite directions, a work supporting table rotatably mounted on said carriage, a bridge carried by said base and extending across the path of travel of said table with said carriage, a mounting for a scribing tool movable along said bridge and itself mounted for vertical reciprocation toward and from said table, a screw rotatably supported by said base beneath said table and extending parallel to said directions, and a nut carried by said carriage and engaging with said screw, which comprises said table formed of two superposed sections, with the upper section rotatable relatively to the lower section, said table sections having arms extending outwardly from their peripheries, one of said arms mounting an idle roller for rotation about a vertical axis, a nut member having an abutment and a pivoted lever engaging opposite sides of said roller, said lever being spring pressed against the roller to confine it against said abutment, said abutment having a hard wear plate against which the roller engages, a secondary screw rotatably mounted on said other arm, extending in a direction crosswise of a radius to the axis of rotation of said table, and having threaded engagement with said nut member, for causing rotation of said upper table section on the lower section when said secondary screw is rotated, means for rotating said lower table section, and means for releasably holding the lower table section in different positions in its rotation.

4. The engraving machine as set forth in claim 3, said rotating means for the lower table section including a gear on that table section, a shaft extending in a direction radially of the table to a position outwardly beyond the periphery of that section, and a pinion fixed on the inner end of said last mentioned shaft and meshing with said gear on the table section, whereby rotation of said last mentioned shaft will rotate said table.

5. The engraving machine as set forth in claim 3, said holding means for the lower table section including a locking plunger mounted on the carriage for endwise movement toward and from the under face of the lower table section, said under face having a circular row of recesses concentric with the axis of rotation of the lower table section moving above said plunger, and into and out of which said plunger may move as the recesses move above it in succession.

6. The engraving machine as set forth in claim 3, said rotating means for the lower table section including a gear on that table section, a shaft extending in a direction radially of the table to a position outwardly beyond the periphery of that section, a pinion fixed on the inner end of said last mentioned shaft and meshing with said gear on the table section, whereby rotation of said last mentioned shaft will rotate said table, said holding means for the lower table section including a locking plunger mounted on the carriage for endwise movement toward and from the under face of the lower table section, said under face having a circular row of recesses concentric with the axis of rotation of the lower table section moving with the axis of rotation of the lower table section moving above said plunger, and into and out of which said plunger may move as the recesses move above it in succession.

7. In an engraving machine of the type having a base, a carriage mounted on said base for rectilinear translation in opposite directions, and a work supporting table rotatably mounted on said carriage, the combination for use therewith comprising a bridge carried by said base and extending across the path of travel of said table with said carriage, said bridge having guide ways on its upper face, an auxiliary carriage member resting on the upper face of said bridge and having portions running on and guided by said ways, means on said bridge and cooperating with said member for causing selected adjustment of said member along said bridge, said auxiliary carriage member having thereon a vertically extending guide groove, a cutter slide disposed in said groove for rectilinear reciprocation therein, anti-friction, rolling bearings between the sides of said slide and the sides of said guide, spring means acting on said cutter slide for resiliently resisting movement of the cutter slide in both directions vertically from an intermediate position, and selectively operable means for changing said intermediate position.

8. In an engraving machine of the type having a base, a carriage mounted on said base for rectilinear translation in opposite directions, and a work supporting table rotatably mounted on said carriage, the combination for use therewith comprising a bridge carried by said base and extending across the path of travel of said table with said carriage, said bridge having guide ways on its upper face, an auxiliary carriage member resting on the upper face of said bridge and having portions running on and guided by said ways, means on said bridge and cooperating with said member for causing selected adjustment of said member along said bridge, said auxiliary carriage member having thereon a vertically extending guide groove, a cutter slide disposed in said groove for rectilinear reciprocation therein, anti-friction, rolling bearings between the sides of said slide and the sides of said guide, spring means acting on said cutter slide for resiliently resisting movement of the cutter slide in both directions vertically from an intermediate position, selectively operable means for changing said intermediate position, an element movable toward and from a face of said cutter slide, and a spring urging said element frictionally against said cutter slide to prevent chattering of the slide.

9. In an engraving machine of the type having a base, a carriage mounted on said base for rectilinear translation in opposite directions, and a work supporting table rotatably mounted on said carriage, the combination for use therewith comprising a bridge carried by said base and extending across the path of travel of said table with said carriage, said bridge having guide ways on its upper face, an auxiliary carriage member resting on the upper face of said bridge and having portions running on and guided by said ways, means on said bridge and cooperating with said member for causing selected adjustment of said member along said bridge, said auxiliary carriage member having thereon a vertically extending guide groove, a cutter slide mounted in said groove for vertical reciprocation therein and at its lower end having means to mount a scribing tool, an element mounted on said auxiliary carriage for movement in a direction parallel to that of said slide, means for shifting said element selectively back and forth in its direction of movement, and a pair of springs disposed on opposite faces of said element and engaging with abutments on said slide to resist its said back and forth movements in both directions and yieldingly hold said slide in an intermediate position.

10. In an engraving machine of the type having a base, a carriage mounted on said base for rectilinear translation in opposite directions, and a work supporting table rotatably mounted on said carriage, the combination for use therewith comprising a bridge carried by said base and extending across the path of travel of said table with said carriage, said bridge having guide ways on its upper face, an auxiliary carriage member resting on the upper face of said bridge and having portions running on and guided by said ways, means on said bridge and cooperating with said member for causing selected adjustment of said member along said bridge, said auxiliary carriage member having thereon a vertically extending guide groove, a cutter slide mounted in said groove for vertical reciprocation therein and at its lower end having means to mount a scribing tool, an element mounted on said auxiliary carriage for movement in a direction parallel to that of said slide, means for shifting said element selectively back and forth in its direction of movement, and a pair of springs disposed on opposite faces of said element and engaging with abutments on said slide to resist its said back and forth movements in both directions and yieldingly hold said slide in an intermediate position, said slide having one of its said abutments that are engaged by said springs adjustable in the direction of travel of said slide.

11. In an engraving machine of the type having a base, a carriage mounted on said base for rectilinear translation in opposite directions, and a work supporting table rotatably mounted on said carriage, the combination for use therewith comprising a bridge carried by said base and extending across the path of travel of said table with said carriage, said bridge having guide ways on its upper face, an auxiliary carriage member resting on the upper face of said bridge and having portions running on and guided by said ways, means on said bridge and cooperating with said member for causing selected adjustment of said member along said bridge, said auxiliary carriage member having thereon a vertically extending guide groove, a cutter slide mounted in said groove for vertical reciprocation therein and at its lower end having means to mount a scribing tool, an element mounted on said auxiliary carriage and having vertically spaced faces that are in planes normal to the direction of travel of the slide, said slide having abutments vertically spaced and facing each other, and between which said spaced faces are disposed, a pair of springs, one disposed against each of said spaced faces and compressed between that spaced face and one of said abutments for resisting resiliently any movement of said slide from an intermediate position in its travel, the upper one of said spaced abutments of said slide being shiftable back and forth toward that part of said element having said spaced faces, to vary the relative spring actions on said slide.

12. In an engraving machine of the type having a base, a carriage mounted on said base for rectilinear translation in opposite directions, and a work supporting table rotatably mounted on said carriage, the combination for use therewith comprising a bridge carried by said base and extending across the path of travel of said table with said carriage, said bridge having guide ways on its upper face, an auxiliary carriage member resting on the upper face of said bridge and having portions running on and guided by said ways, means on said bridge and cooperating with said member for causing selected adjustment of said member along said bridge, said auxiliary carriage member having thereon a vertically extending guide groove, a cutter slide mounted in said groove for vertical reciprocation therein and at its lower end having means to mount a scribing tool, spring means acting on said cutter slide for resiliently resisting movement of the cutter slide vertically in both directions from an intermediate position, and a spring pressed brake pressing laterally against said cutter slide to prevent chattering of said mounting.

13. In an engraving machine of the type having a base, a carriage mounted on said base for rectilinear translation in opposite directions, and a work supporting table rotatably mounted on said carriage, the combination for use therewith comprising a bridge carried by said base and extending across the path of travel of said table with said carriage, said bridge having guide ways on its upper face, an auxiliary carriage member resting on the upper face of said bridge and having portions running on and guided by said ways, means on said bridge and cooperating with said member for causing selected adjustment of said member along said bridge, said auxiliary carriage member having thereon a vertically extending guide groove, a cutter slide mounted in said groove for vertical reciprocation therein and at its lower end having means to mount a scribing tool, spring means acting on said cutter slide for resiliently resisting movement of the cutter slide vertically in both directions from an intermediate position, and means for varying the action of said spring means in both directions.

References Cited in the file of this patent

UNITED STATES PATENTS

| 342,464 | Richards | May 25, 1886 |
|---|---|---|
| 435,246 | Ourdan | Aug. 26, 1890 |
| 467,825 | McCabe | Jan. 26, 1892 |
| 969,496 | Royle | Sept. 6, 1910 |
| 1,331,966 | Phinney et al. | Feb. 24, 1920 |
| 1,666,634 | Thomson | Apr. 17, 1928 |
| 2,182,707 | Shipman | Dec. 5, 1939 |
| 2,249,898 | Harley et al. | July 22, 1941 |
| 2,307,501 | Goddu et al. | Jan. 5, 1943 |
| 2,312,154 | Fischer | Feb. 23, 1943 |
| 2,323,686 | Sommerfeld | July 6, 1943 |
| 2,365,503 | White | Dec. 19, 1944 |
| 2,679,787 | Froehlich | June 1, 1954 |

FOREIGN PATENTS

| 334,727 | Germany | Mar. 17, 1921 |